(12) United States Patent
Steffens

(10) Patent No.: US 10,285,082 B2
(45) Date of Patent: May 7, 2019

(54) TESTING DEVICE AND METHOD FOR TESTING A DEVICE UNDER TEST WITH RESPECT TO ITS BEAMFORMING BEHAVIOR

(71) Applicant: Rohde & Schwarz GmbH & Co. KG, Munich (DE)

(72) Inventor: Johannes Steffens, Rosenheim (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 15/400,328

(22) Filed: Jan. 6, 2017

(65) Prior Publication Data

US 2018/0139633 A1 May 17, 2018

Related U.S. Application Data

(60) Provisional application No. 62/423,425, filed on Nov. 17, 2016.

(51) Int. Cl.
*H04W 24/06* (2009.01)
*H04B 7/06* (2006.01)
*H04B 17/15* (2015.01)

(52) U.S. Cl.
CPC .......... *H04W 24/06* (2013.01); *H04B 7/0617* (2013.01); *H04B 17/15* (2015.01)

(58) Field of Classification Search
CPC ............................ H04W 24/06; H04B 7/0617
USPC ........................................................ 455/115.2
See application file for complete search history.

(56) References Cited

U.S. PATENT DOCUMENTS

| 6,366,622 B1* | 4/2002 | Brown ..................... H04B 1/30 329/304 |
| 6,571,082 B1* | 5/2003 | Rahman ............. H04B 17/0087 342/451 |
| 7,965,986 B2* | 6/2011 | Foegelle ............... H04W 24/00 324/627 |
| 2008/0056340 A1 | 3/2008 | Foegelle |

* cited by examiner

*Primary Examiner* — Sanh D Phu
(74) *Attorney, Agent, or Firm* — Ditthavong & Steiner, P.C.

(57) ABSTRACT

A testing device for testing a device under test emitting a number of beams with respect to its beamforming behavior. Said testing device comprises an antenna, an analyzing unit, and a number of reflectors. Furthermore, each of the number of reflectors is configured to reflect at least one of the number of beams of the device under test to the antenna of the testing device.

15 Claims, 4 Drawing Sheets

TESTING DEVICE AND METHOD FOR TESTING A DEVICE UNDER TEST WITH RESPECT TO ITS BEAMFORMING BEHAVIOR

RELATED APPLICATIONS

The present application claims priority to U.S. Provisional Application No. 62/423,425, filed Nov. 17, 2016, the entire contents of which is herein incorporated by reference.

TECHNICAL FIELD

The invention relates to a testing device and a testing method for testing a device under test emitting a number of beams with respect to the beamforming behavior of the device under test.

BACKGROUND ART

Generally, in times of an increasing number of wireless communication applications employing MIMO (Multiple Input Multiple Output) systems such as LTE (Long Term Evolution), there is a growing need of a testing device and a testing method for testing devices under test applying such systems, and thus emitting a number of beams, with special respect to their beamforming behavior.

US 2008/0056340 A1 discloses a system for testing a wireless device with multiple antennas. In this context, a plurality of antennas are placed around a device under test in an anechoic chamber. However, according to said disclosure, the usage of multiple antennas is obligatory, which disadvantageously leads to high costs for testing a device under test emitting a number of beams due to an increased complexity of the testing device and the higher material consumption.

Accordingly, there is a need to provide a testing device and a testing method for testing a device under test emitting a number of beams in a most cost-efficient manner.

SUMMARY OF THE INVENTION

According to a first aspect of the invention, a testing device for testing a device under test emitting a number of beams with respect to its beamforming behavior is provided. The testing device comprises an antenna, an analyzing unit, and a number of reflectors. Furthermore, each of the number of reflectors is configured to reflect at least one of the number of beams of the device under test to the antenna of the testing device.

Advantageously, the reflectors are arranged in parallel, which leads to less complexity of the testing device, and thus to a more cost-efficient arrangement.

According to a first preferred implementation form of the first aspect, the antenna is configured to simultaneously or successively receive the number of beams and to provide the number of beams emitted by the device under test for the analyzing unit of the testing device. In addition to this, the analyzing unit is configured to analyze the number of beams. Advantageously, with respect to each of the number of beams, a common time base is provided. Consequently, the testing device, respectively the analyzing unit of the testing device, can be calibrated in a simple and most cost-efficient manner.

According to a further preferred implementation form of the first aspect, the number of beams is equal to the number of reflectors. Alternatively, the number of beams is greater than the number of reflectors. Advantageously, material consumption is reduced to a minimum, which leads to lowest possible costs.

According to a further preferred implementation form of the first aspect, the testing device, respectively the analyzing unit, further comprises a downconverter which is configured to down-convert the frequency of each of the number of beams before analyzing the number of beams with the aid of the analyzing unit. Advantageously, costs are further reduced because there is no need of expensive waveguides for connecting the antenna to the analyzing unit.

According to a further preferred implementation form of the first aspect, the testing device further comprises a number of absorbers which are configured to separate each of the number of beams from one another. Advantageously, solely the beams emitted by the device under test to be investigated reach the antenna of the testing device, which leads to highly accurate measurements.

According to a further preferred implementation form of the first aspect, the number of absorbers is greater than the number of beams. Alternatively, the number of absorbers is equal to the number of beams. Advantageously, material consumption is reduced to a minimum and absorbers are used in a most cost-efficient manner.

According to a further preferred implementation form of the first aspect, the testing device further comprises a number of absorbers which are configured to separate some of the number of beams in groups from one another. Advantageously, material usage is further reduced.

According to a further preferred implementation form of the first aspect, the number of absorbers is lower than the number of beams. Advantageously, absorbers are used in a most cost-efficient manner.

According to a second aspect of the invention, a testing method for testing a device under test emitting a number of beams with respect to its beamforming behavior is provided. The testing method comprises the steps of reflecting at least one of the number of beams of the device under test with the aid of a number of reflectors to a reference point, simultaneously or successively receiving the number of beams at the reference point, and analyzing the number of beams.

Advantageously, the reflectors are arranged in parallel, which leads to less complexity, and thus to a higher cost-efficiency.

According to a first preferred implementation form of the second aspect, the number of beams is equal to the number of reflectors. Alternatively, the number of beams is greater than the number of reflectors. Advantageously, material consumption is reduced to a minimum, which leads to lowest possible costs.

According to a further preferred implementation of the second aspect, the frequency of each of the number of beams is down-converted before analyzing the number of beams. Advantageously, costs are further reduced because there is no need of expensive waveguides.

According to a further preferred implementation of the second aspect, with the aid of a number of absorbers, each of the number of beams is separated from one another.

According to a further preferred implementation of the second aspect, the number of absorbers is greater than the number of beams. Alternatively, the number of absorbers is equal to the number of beams. Advantageously, material consumption is reduced to a minimum and absorbers are used in a most cost-efficient manner.

According to a further preferred implementation of the second aspect, with the aid of a number of absorbers, some of the number of beams are separated in groups from one another. Advantageously, material usage is further reduced.

According to a further preferred implementation of the second aspect, the number of absorbers is lower than the number of beams. Advantageously, absorbers are used in a most cost-efficient manner.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
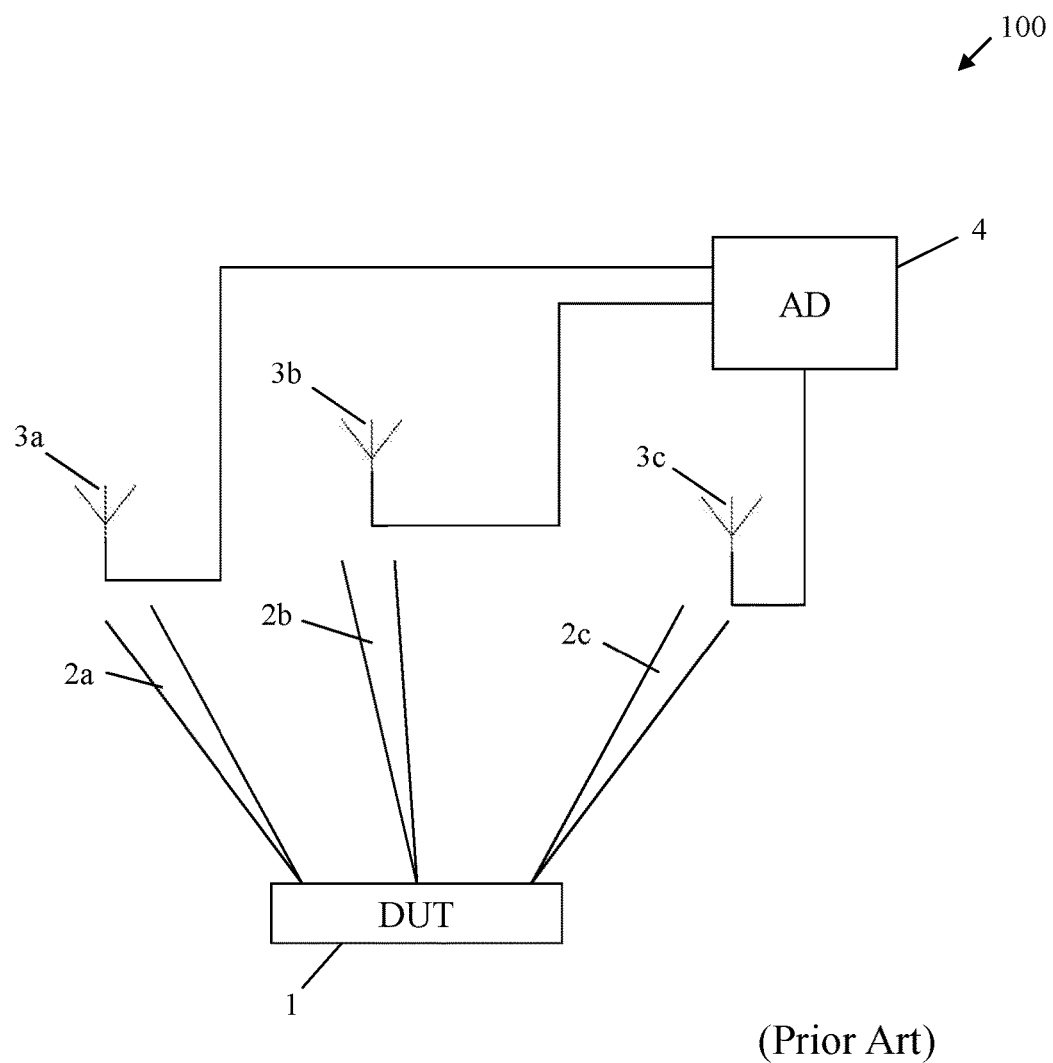
FIG. 1 shows an exemplary embodiment of the prior art.

Firstly, FIG. 1 illustrating the prior art shows a device under test 1 exemplarily emitting three beams 2a, 2b, 2c. These beams 2a, 2b, 2c are received with the aid of three antennas 3a, 3b, 3c and then analyzed with the aid of an analyzing device 4.

In this context, according to the prior art, the number of antennas has to be at least as great as the number of beams to be investigated. In addition to this, the analyzing device 4 has to provide either a multiplexer in order to switch between the antennas 3a, 3b, 3c for successively analyzing the beams 2a, 2b, 2c or a plurality of measurement channels, respectively three channels in this exemplary case, in order to simultaneously analyze the beams 2a, 2b, 2c emitted by the device under test 1.

It is evident that testing a device under test emitting a number of beams according to the prior art leads to high costs because not only a plurality of antennas is required but also a multiplexer in combination with an analyzing device or a more complex analyzing device providing a plurality of measurement channels is needed.

In addition to this, and also in accordance with the prior art, with special respect to high transmitting frequencies of the device under test, either expensive waveguides or a plurality of downconverters are necessary in order to properly connect the plurality of antennas with the analyzing device, which further increases costs.

Figure 2:
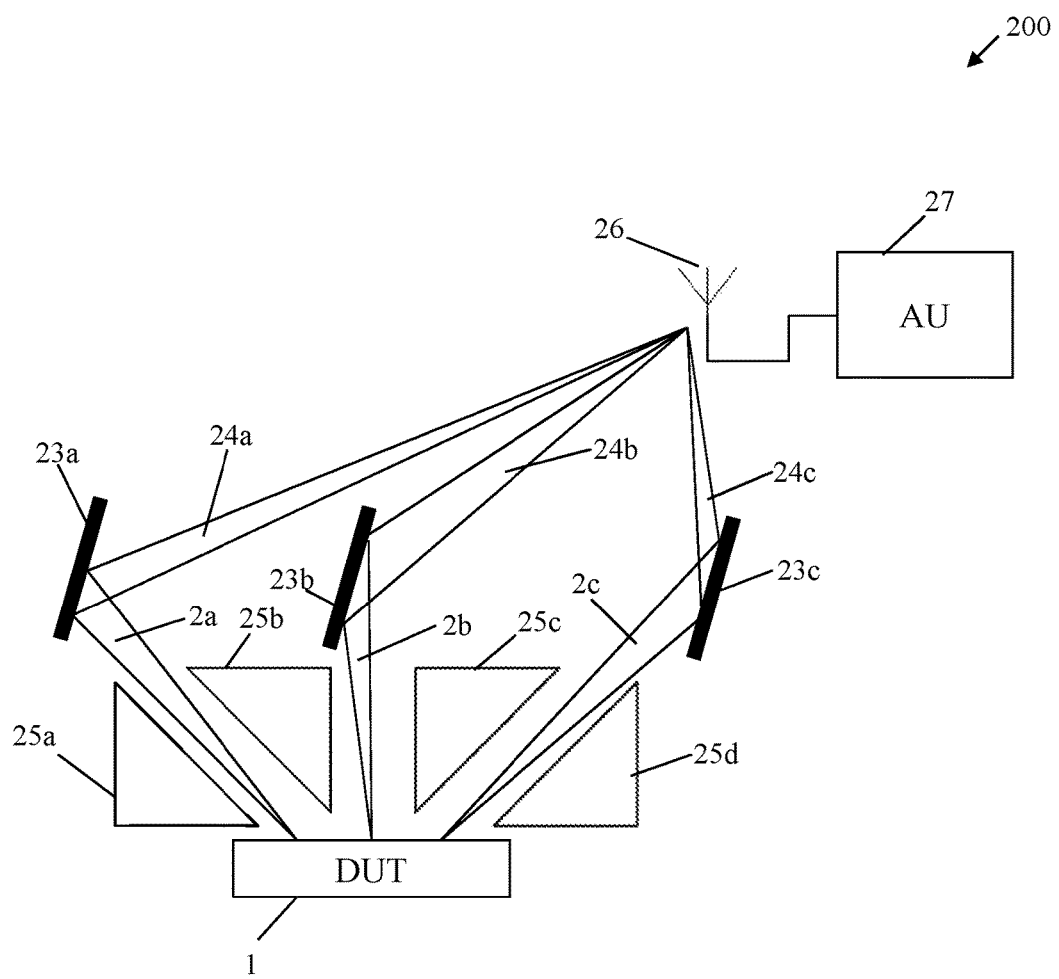
FIG. 2 shows an exemplary embodiment of the first aspect of the present invention.

As a consequence of this, these costs for testing a device under test with special respect to its beamforming behavior are massively reduced with the aid of the present invention, an exemplary embodiment 200 of which is illustrated by FIG. 2.

In the exemplary case according to FIG. 2, a device under test 1 emits three beams 2a, 2b, 2c. Each of these beams 2a, 2b, 2c is then reflected to just one antenna 26 connected to an analyzing unit 27 with the aid of three reflectors 23a, 23b, 23c. In this manner, there is just a single antenna 26 required, which advantageously saves costs due to a significantly lower material consumption.

In addition to this, the complexity of the analyzing unit can be as low as possible because there is neither required a multiplexer to switch between different antennas nor a plurality of measurement channels due to the fact that a single antenna 26 and a single measurement channel are perfectly sufficient for testing the device under test 1 with special respect to its beamforming behavior.

Furthermore, especially in the case of high transmit frequencies of the device under test 1, there is advantageously required just a single waveguide, or respectively a single downconverter and one or two analogue to digital converters in order to properly connect the antenna 26 to the analyzing unit 27. This illustrated with respect to FIG. 3.

Figure 3:
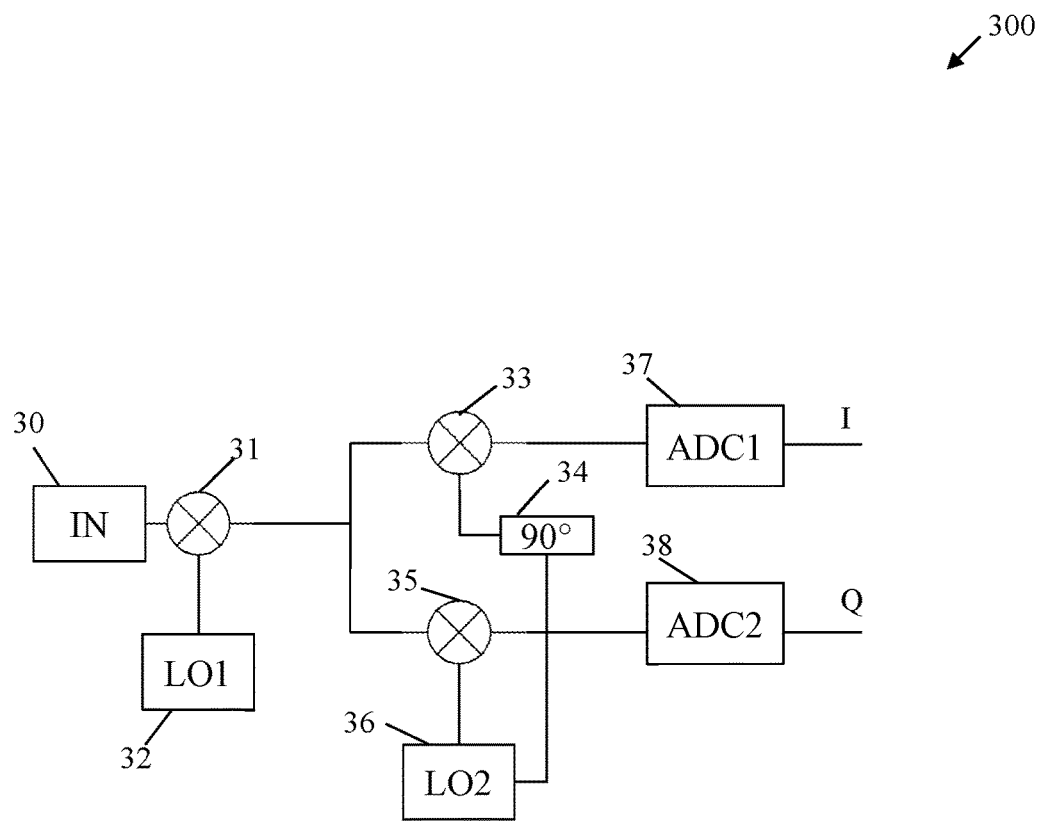
FIG. 3 shows a detail of an embodiment of an analyzing unit of the first aspect of the invention.

FIG. 3 shows a detail of an embodiment 300 of the analyzing unit 27. The input 30 provides an input signal, respectively the output signal of the antenna 26. The output signal of the antenna 26 is then converted to an intermediate frequency signal with the aid of a first mixer 31 and a first local oscillator frequency signal provided by a first local oscillator 32. Furthermore, said intermediate frequency signal is simultaneously passed to a second mixer 33 and a third mixer 35. The intermedia frequency signal is then simultaneously converted to an in-phase signal with the aid of the second mixer 33 and a second local oscillator frequency signal provided by a second local oscillator 36, wherein the second oscillator frequency signal is additionally shifted in phase by 90 degrees with the aid of a phase shifter 34, and to a quadrature-phase signal with the aid of the third mixer 35 and said second local oscillator frequency signal without being shifted in phase. Afterwards, the in-phase signal is digitized with the aid of a first analogue to digital converter 37 whereas the quadrature-phase signal is digitized with the aid of a second analogue to digital converter 38.

One can see, with special respect to reducing complexity and costs to a minimum, it is particular advantageous that arrangement 300 according to FIG. 3 is just needed once instead of n times because in accordance with the present invention, the usage of a single antenna is perfectly sufficient in order to do the desired measurements.

Moreover, as it can be seen from FIG. 2, the beams 2a, 2b, 2c emitted by the device under test 1 are advantageously separated from one another with the aid of absorbers 25a, 25b, 25c, 25d. In this manner, due to the fact that solely the desired beams 2a, 2b, 2c to be investigated reach the antenna 26 in a defined way, there is advantageously no need of an anechoic chamber, which further reduces costs.

In addition to this and further advantageously, the reflectors 23a, 23b, 23c are arranged in parallel, which further reduces complexity, and thus costs.

Furthermore, besides all the above-mentioned benefits of the present invention, further major advantages should be pointed out here as follows:

Whereas there is advantageously no switching time during testing, due to the fact that the number of beams emitted by the device under test can even be simultaneously received, a most time-saving, and thus very cost-efficient, single shot is perfectly sufficient in order to get the desired measurement results.

Additionally, with respect to each of the number of beams emitted by the device under test, a common time base is provided, which advantageously leads to the fact that the testing device can be calibrated in a simple and most cost-efficient manner.

Further advantageously, the temporal behavior of beam steering with respect to each of the number of beams can also be investigated.

Figure 4:
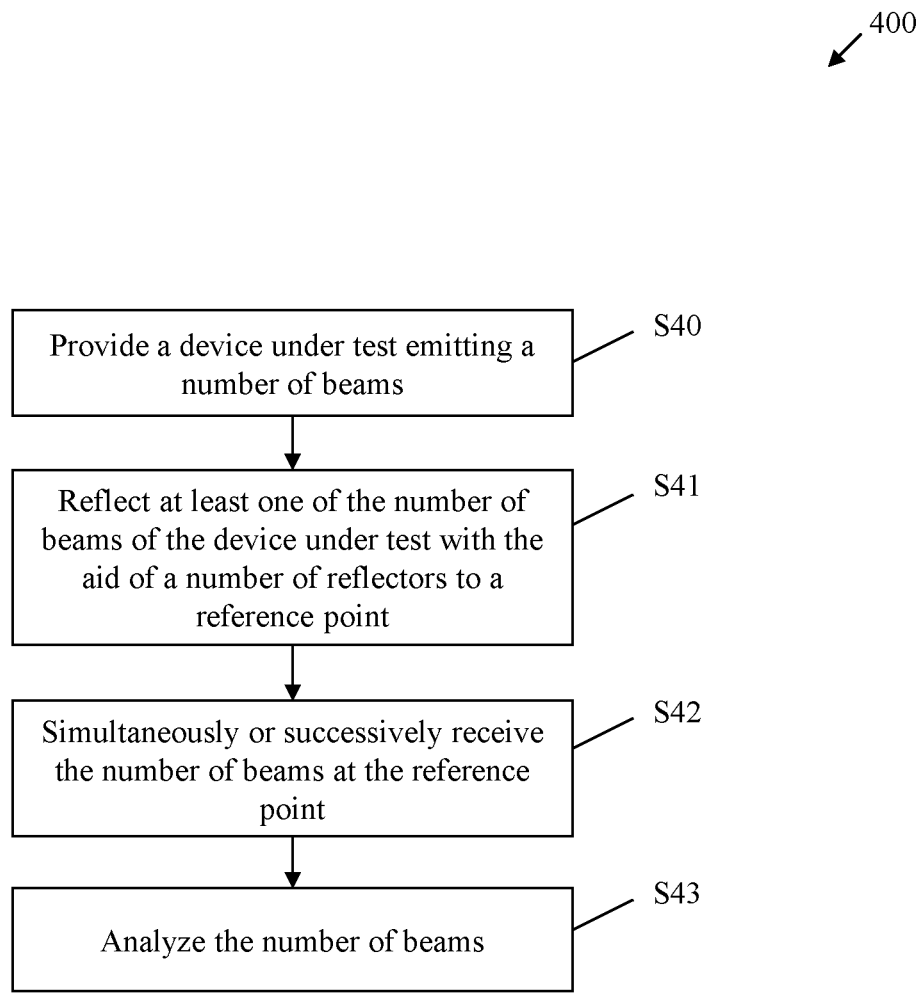
FIG. 4 shows a flow chart of an exemplary embodiment of the second aspect of the invention.

Finally, FIG. 4 shows a flow chart 400 of the inventive method. In a first step S40, a device under test emitting a number of beams is provided. In a second step S41, at least one of the number of beams of the device under test is reflected with the aid of a number of reflectors to a reference point. Then, in a third step S42, the number of beams of the device under test is simultaneously or successively received at the reference point. In addition to this, the fourth step S43 relates to analyzing the number of beams emitted by the device under test with special respect to the beamforming behavior of the device under test.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A testing device for testing a device under test emitting a number of beams with respect to beamforming behavior of the device under test, the testing device comprising:
   an antenna,
   an analyzing unit connected to the antenna, and
   a number of reflectors arranged in parallel,
   wherein during the testing each of the number of reflectors is configured to reflect at least one of the number of beams of the device under test to the antenna of the testing device,
   wherein there is no switching time during the testing,
   wherein a single shot is used in order to obtain desired measurement results.

2. The testing device according to claim 1,
   wherein the antenna is configured to simultaneously or successively receive the number of beams and to provide the number of beams emitted by the device under test for the analyzing unit of the testing device, and
   wherein the analyzing unit is configured to analyze the provided number of beams.

3. The testing device according to claim 1,
   wherein the number of beams is equal to the number of reflectors, or
   wherein the number of beams is greater than the number of reflectors.

4. The testing device according to claim 1,
   wherein the analyzing unit further comprises a downconverter which is configured to down-convert the frequency of each of the number of beams before analyzing the number of beams with the aid of the analyzing unit.

5. The testing device according to claim 1,
   wherein the testing device further comprises a number of absorbers which are configured to separate each of the number of beams from one another.

6. The testing device according to claim 5,
   wherein the number of absorbers is greater than the number of beams, or
   wherein the number of absorbers is equal to the number of beams.

7. The testing device according to claim 1,
   wherein the testing device further comprises a number of absorbers which are configured to separate some of the number of beams in groups from one another.

8. The testing device according to claim 7,
   wherein the number of absorbers is lower than the number of beams.

9. A testing method for testing a device under test emitting a number of beams with respect to beamforming behavior of the device under test, the testing method comprises the steps of:
   during the testing, reflecting at least one of the number of beams of the device under test with the aid of a number of reflectors to a reference point, wherein the number of reflectors are arranged in parallel,
   simultaneously or successively receiving the number of beams at the reference point, and analyzing the received number of beams,
   wherein there is no switching time during the testing, and
   wherein a single shot is used in order to obtain desired measurement results.

10. The testing method according to claim 9,
    wherein the number of beams is equal to the number of reflectors, or
    wherein the number of beams is greater than the number of reflectors.

11. The testing method according to claim 9,
    wherein the frequency of each of the number of beams is down-converted before analyzing the number of beams.

12. The testing method according to claim 9,
    wherein with the aid of a number of absorbers, each of the number of beams is separated from one another.

13. The testing method according to claim 12,
    wherein the number of absorbers is greater than the number of beams, or
    wherein the number of absorbers is equal to the number of beams.

14. The testing method according to claim 9,
    wherein with the aid of a number of absorbers, some of the number of beams are separated in groups from one another.

15. The testing method according to claim 14,
    wherein the number of absorbers is lower than the number of beams.

* * * * *